Figure 1:
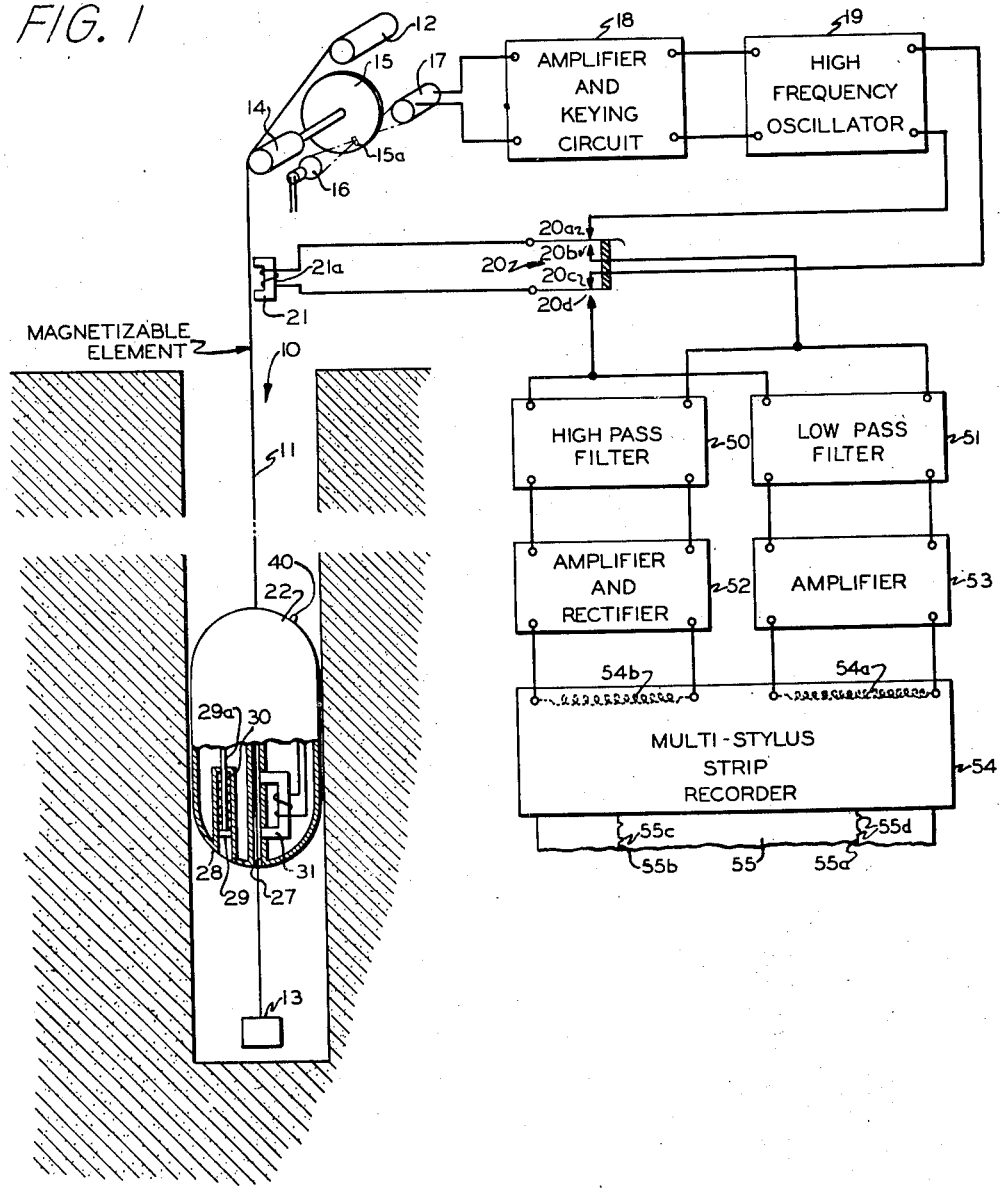

May 4, 1948.    W. G. GREEN    2,441,065
APPARATUS FOR WELL LOGGING
Filed Dec. 1, 1945    2 Sheets-Sheet 1

INVENTOR
WILLIAM G. GREEN
ATTORNEYS

May 4, 1948.    W. G. GREEN    2,441,065
APPARATUS FOR WELL LOGGING
Filed Dec. 1, 1945    2 Sheets-Sheet 2

INVENTOR
WILLIAM G. GREEN
BY Mueller, Dodds & Mann
ATTORNEYS

Patented May 4, 1948

2,441,065

UNITED STATES PATENT OFFICE 2,441,065

APPARATUS FOR WELL LOGGING

William G. Green, Tulsa, Okla., assignor to Engineering Laboratories, Inc., Tulsa, Okla., a corporation of Oklahoma Application December 1, 1945, Serial No. 632,188

6 Claims. (Cl. 346—74)

The present invention relates to bore hole logging apparatus, and more particularly to improved apparatus for recording variable physical characteristics of oil wells.

In oil well logging operations generally, it is the usual practice to lower an exploring instrument into the bore hole which develops an electrical signal representative of the physical characteristic under observation, such, for example, as the pressure within a producing well or the geological structure through which a hole is drilled, and to transmit the signal back to the earth's surface over a pair of insulated conductors for recording. This requires the use of insulated cable comprising two or more circuit conductors and of great strength, which is not only expensive, but is also bulky and heavy in the lengths required to log deep bore holes. A further difficulty inherent in conventional well logging practices is that of obtaining accurate correlation between the signal components and the depths at which the components are developed. Specifically, the instrument lowering cable is cumulatively stretched as it is lowered into a bore hole, with the result that the position of the signal generating instrument in the hole is not accurately indicated by the amount of the cable which has been reeled out in lowering the cable into the hole.

It is an object of the present invention, therefore, to provide an improved apparatus for recording one or more physical characteristics of a bore hole, which obviate the necessity for running circuit conductors between the signal generating instrument and recording equipment located at the earth's surface.

It is another object of the invention to completely obviate the problem of correlating the signal components representative of the physical characteristic under observation with the bore hole depths at which the signal components are developed.

It is another and more general object of the invention to provide improved and simple apparatus which may be easily operated to obtain accurate data on one or more characteristics of a bore hole, and all components of which are compact and light in weight, such that the apparatus may easily be transported from one location to another.

In general, the above objects are realized in accordance with the present invention by practicing the improved method of lowering an elongated recording element into a bore hole, developing a signal representative of the well characteristic under observation at a predetermined depth in the bore hole, and recording the signal upon the elongated recording element at a point therealong representative of the hole depth at which the signal is developed.

Figure 2:
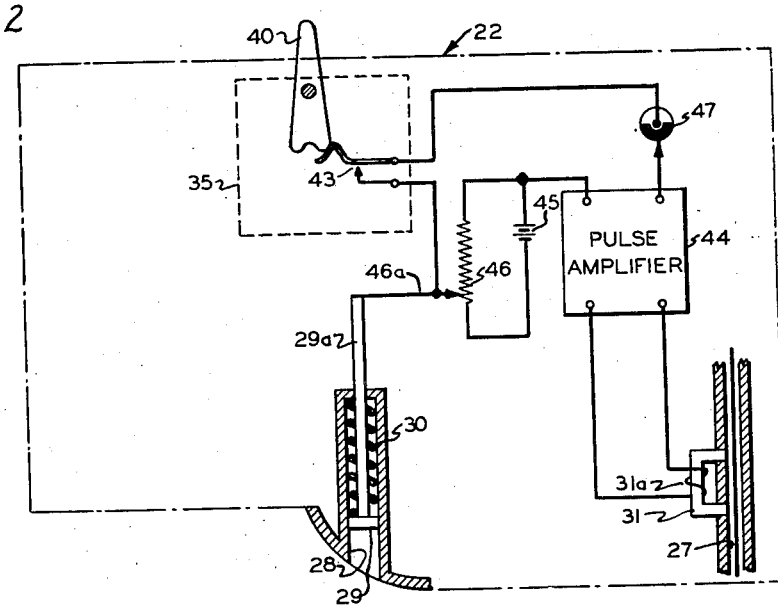
Figure 3:
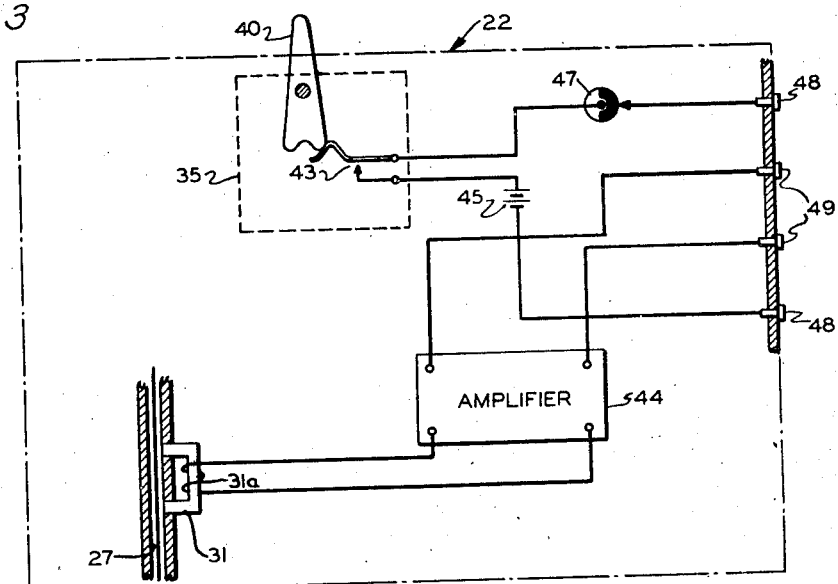

The invention, both as to its organization and method of operation, together with further objects and advantages thereof, will best be understood by reference to the following specification taken in connection with the accompanying drawings, in which:

Fig. 1 schematically illustrates the present improved apparatus for recording a physical characteristic of a bore hole;

Fig. 2 is a schematic view illustrating the arrangement of certain of the circuit components embodied in the apparatus; and Fig. 3 is a schematic view illustrating a modification of the circuit components shown in Fig. 2.

Referring now to the drawings and more particularly to Fig. 1 thereof, the present improved apparatus is there illustrated in its use to record data concerning one of the variable physical characteristics of a bore hole 10. In the specific embodiment of the invention there illustrated, the apparatus may be employed to provide an accurate and continuous log of the oil or gas pressure within the bore hole at all points along the length of the hole. In brief, the apparatus comprises an elongated magnetizable recording element 11 in the form of a steel wire of small diameter normally carried by a winding spool or reel 12. This element is adapted to be unwound from the reel 12 and lowered into the bore hole 10, and to that end carries a weight or sinker 13 at its lower free end.

In order to record the length of the magnetizable element 11 fed into the bore hole 10, apparatus is provided for producing depth markings at evenly spaced points along the element 11 as the element is lowered into the bore hole. This apparatus comprises a combination recording and reproducing head 21 of conventional structure having pole faces arranged in recording position relative to the element 11, and having an exciting and pick up winding 21a to which short pulses of high frequency current are delivered from a high frequency oscillator 19 through the normally closed contacts 20a and 20c of a manually operable changeover key 20. This oscillator has an output frequency (of the order of 10,000 cycles per second) well above the highest frequency component of the signal generated to represent the bore hole characteristic under observation. The output voltage of the oscillator 19 is keyed to produce the desired depth indicating current pulses in accordance with movement of the magnetizable element 11 into the bore hole 10. To this end, the element 11 is passed partially around the surface of a driving drum 14 which is shaft connected to a shutter disk 15 provided with a light slit 15a having the function of intermittently exposing the light sensitive surface of a photo electric cell 17 to the light radiated from a light source in the form of a lamp 16. The cell 17, in turn, controls the input circuit of a combined amplifier and keying circuit 18. This circuit, which may be of conventional arrangement, performs the function of so controlling the oscillator 19 that the latter unit can only operate to develop a high frequency output voltage when light is directed from the source 16 through the slit 15a to the sensitive surface of the cell 17.

For the purpose of developing a signal representative of the particular characteristic of the bore hole 10 under observation and of recording this signal upon the magnetizable element 11, signal generating and recording facilities are provided, the components of which are housed within a capsule 22 preferably formed of a plastic material or non-magnetic metal. This capsule or bomb is adapted to be dropped into the bore hole 10 and is provided along its longitudinal axis with internal walls defining a bore 27 through which the magnetizable element 11 is adapted to be threaded. A recording head 31 having pole face ends extending through the internal walls defining the bore 27 is utilized magnetically to record the signal representative of the characteristic under observation upon the element 11 as the capsule 22 is moved longitudinally of the bore hole. In order to obtain an indication of the pressure within the bore hole 10, a pressure responsive piston 29 exposed to the hole pressure is provided. Specifically, this piston is movable within a cylinder 28 formed by re-entrant wall portions of the capsule 22, a coil spring 30 embracing the piston rod 29a being utilized to counterbalance the variable pressure exerted against the exposed surface of the piston 29.

All components of the signal generator are housed within the capsule 22. Specifically, the signal generating equipment comprises a pulse amplifier 44 having its output circuit coupled to the exciting winding 31a of the recording head 31 and having an input circuit to which are delivered voltage pulses of varying amplitude accurately representative of the pressure indicated by the position of the pressure responsive piston 29. The pulses are generated through the action of a rotatable pulsing element 47 which is bridged across the input terminals of the amplifier 44 in series with the contacts of an on-off switch 35 and a variable portion of a potentiometer resistor 46, the terminals of which are connected to the terminals of a direct current source in the form of a battery 45. The switch 35 is provided with an actuating element 40 which extends through the top wall of the capsule 22 for manual manipulation externally of the capsule. The magnitude of the voltage pulses periodically impressed across the input terminals of the amplifier 44 through the pulsing element 47 is determined by the position of the adjustable wiper 46a along the potentiometer resistor 46. This wiper is directly connected mechanically to the piston rod 29a so that its position along the resistor 46, and hence the amplitude of the pulses developed by the pulsing element 47, is directly related to the setting of the piston 29 within the cylinder 28 and hence the pressure acting upon this piston. Preferably, the pulsing element 47 is driven at a constant predetermined speed by means of a suitable spring actuated clock mechanism, not shown, although if desired it may be driven by a small constant speed motor connected for energization from the current source 45.

For the purpose of forming a permanent record of the variable characteristic under observation and of accurately correlating the recorded characteristic with the depth of the bore hole, facilities are provided for re-recording the signals and depth indications initially recorded on the magnetizable element 11 as this element is withdrawn from the bore hole. These facilities comprise a multi-stylus strip recorder 54 having stylus actuating coils 54a and 54b to which the signal representative of the characteristic under observation and the depth signals are respectively transmitted from the exciting winding of the head 21 when acting as a reproducing or pick up head. A low pass filter 51 followed by a signal amplifier 53 is included in the signal channel leading to the coil 54a to prevent the depth signals from exciting this coil. Similarly, a high pass filter 50 is employed to prevent the low frequency signal components representative of pressure variations within the bore hole from being impressed upon the coil 54b. In other words, this filter only passes the high frequency pulses representative of the well depth indications. These pulses are transmitted from the output terminals of the filter 50 through a combination amplifier and rectifier unit 52 to appear as direct current pulses in the coil 54b.

Briefly to consider the manner in which the above described apparatus is employed to instrument the present improved method of well logging, it is pointed out that the first step required in using the apparatus is that of passing the free end of the magnetizable element 11 around the drum 14 and threading the same through the bore 27 of the capsule 22. The sinker or weight 13 may now be attached to the end of the element 11 and positioned just at the surface entrance to the bore hole 10. During reeling out of the element 11, the capsule 22 is preferably so supported that this element is free for unrestricted movement through the bore 27 of the capsule. With the sinker 13 flush with the earth's surface at the mouth of the bore hole 10, the key 20 may be actuated to its illustrated position wherein the contacts 20a and 20c are closed, and the two units 18 and 19 conditioned for operation in the usual manner. Further, the lamp 16 should be energized in order to prepare the equipment for recording of the depth signals using the element 11 as it is lowered into the bore hole 10.

During movement of the magnetizable element longitudinally downward through the bore hole, this element obviously functions to rotate the drum 14 and the shutter disk 15. Each time the disk 15 is rotated through one revolution, light from the source 16 is transmitted through the slit 15a to impinge upon the light sensitive surface of the cell 17 and thus activate the high frequency oscillator 19 under the control of the amplifier and keying circuit 18. In operating, this oscillator transmits a high frequency current pulse through the contacts 20a and 20c to the winding 21a of the recording head. This current pulse is recorded in the usual manner upon the element 11 at a predetermined point therealong. Thus, it will be understood that as the element 11 is lowered into the bore hole, high frequency signal pulses are recorded at evenly spaced points along this element. It is also noted that the path of rotation of the light slit 16a is of such length as to represent a predetermined length of the element 11, such, for example, as one foot, entering the bore hole 10. It is pointed out further that the output frequency of the oscillator 19 is so chosen as to permit the depth signals to be readily filtered from the low frequency signals representative of the bore hole characteristic under observation. Another important feature of the present method of recording the depth signals upon the element 11 pertains to the fact that no compensation for stretch of this element during re-recording of these signals is required. Specifically, as the element 11 is lowered into the hole, the portion thereof moving past the recording head 21 is increasingly stretched. Since, however, the disk 15 is rotated through a given angular increment in response to movement of a given increment of the element 11 past the recording head 21 regardless of the amount of tension and hence stretch in the element, the spacing between the depth signals as they are recorded upon the element 11 remains uniform.

After the sinker 13 has been lowered to the bottom of the bore hole 10 or to a desired position longitudinally of the bore hole, movement of the element is arrested. The next step is that of lowering the capsule 22 into the bore hole for the purpose of generating and recording a signal representative of the particular physical characteristic under observation, i. e., the pressure. This is accomplished by first actuating the switch 35 to its closed circuit setting where in the contacts 43 are closed and then dropping the capsule into the bore hole. With these switch contacts closed and the pulsing element 47 in operation, voltage pulses are impressed across the exciting winding 31a of the recording head 31 at the output side of the pulse amplifier 44 which have a variable amplitude directly related to the position of the wiper 46a along the potentiometer resistor 46. Accordingly, as the position of the piston 29 within the cylinder 28 changes in response to variations in the fluid or gas pressure within the hole, to effect corresponding changes in setting of the wiper 46a along the resistor 46, voltage pulses of varying amplitude directly related to the pressure under observation are impressed across the winding 31a. These pulses are magnetically recorded in the usual manner upon the element 11 so that the amplitude of each pulse is accurately indicative of the pressure of the particular location of the capsule along the hole at which it is generated. After the capsule 22 has reached the bottom of the hole to produce a continuous record of the pressure within the bore hole, it engages the sinker 13 to be pulled out of the hole with the element 11.

After the initial recording operation is thus completed, and as the capsule is pulled out of the bore hole, the depth and pressure signals recorded along the element 11 may be transcribed or re-recorded in permanent form. To this end, the key 20 is actuated to open the contacts 20a and 20c and close the contacts 20b and 20d. With the key 20 in this position, the depth signal generating facilities are obviously rendered inoperative to excite the winding 21a. The next step is that of reeling in the magnetizable element 11 by suitably actuating the reel or spool 12. As this element is pulled out of the bore hole 10, it moves past the recording head 21, with the result that the signals recorded thereon are picked up by the winding 21a and transmitted to the input terminals of the high and low pass filters 50 and 51. The filter 50 is designed to pass only the high frequency depth signals and to reject the low frequency pressure signals. The depth signals as passed by this filter are amplified and rectified in the unit 52 to appear as current pulses in the stylus actuating coil 54b. The resulting periodic deflection of the stylus controlled by this coil serves to produce a record line 55b on the record strip 55 having offset points 55c therealong spaced a distance accurately representing a given increment of hole depth. The low pass filter 51 functions to reject the high frequency depth signals and to pass only the low frequency signals representative of pressure. These signals are amplified through the amplifier 53 and impressed upon the stylus actuating coil 54a to effect periodic peaking of the trace 55a representing pressure. The amplitude of the peaks 55d thus produced in the trace 55a is, of course, a measure of the pressure at various points in the bore hole. Moreover, since the position of the various peaks longitudinally of the record strip 55 is accurately correlated with the depth indications 55c provided along the trace 55b, the pressure at any particular point along the hole may be readily determined. Thus, a permanent record is produced which provides accurate data concerning the pressure within the hole at any point therealong.

From the preceding explanation, it will be readily apparent that the factor of stretch in the magnetizable element 11 does not introduce any error whatever in correlating the pressure signals to the depth signals during the re-recording or transcribing operation. It is true that this element is, by virtue of its own cumulative weight, appreciably stretched along its upper region as it is lowered into the bore hole, particularly at the depths ordinarily encountered in deep-hole logging operations. Error in correlation is avoided, however, since the stretch is the same during both the initial recording and transcribing operations, as regards both the depth and pressure signals. Specifically, and by way of example, during final movement of the element 11 into the well and initial movement out of the well during the re-recording operation, the extent of elongation of that portion of the element adjacent the top of the well due to stretch is exactly the same. This means that the signals are recorded on the element and picked up by the head 21 during the transcribing operation with exactly the same stretch elongation of the element at all points therealong. Hence the depth signals are related to the pressure signals with precision accuracy at all points longitudinally of the permanent record strip 55 and further, the depth indicated by the accumulation of depth signals is accurately representative of the total bore hole depth.

After the re-recording operation has been completed, the sinker 13 may be removed from the end of the element 11 and reeling in of the element completed. The spool or reel 12 upon which the element 11 is wound may, if desired, be preserved as an original record of the logging operation. Alternately, the record inscribed thereon may be magnetically erased as the element passes from the drum 14 to the reel 12 during the reeling in operation through the use of conventional erasing facilities. In the latter case the element 11 may obviously be used repeatedly for other logging operations.

Although the method and apparatus have been described in their use to provide a log of the pressure existent within a producing well, it will be understood that they are equally applicable to any well logging operation requiring instrument traverse of the bore hole. For example, they may be utilized to log the geological formation or structure traversed by a bore hole. This type of log may be obtained by modifying the signal generating equipment within the capsule 22 to include the facilities illustrated in Fig. 3 of the drawings. In the signal generator circuit there shown, the pulsing cam 47 is used in conjunction with the current source 45 to deliver voltage pulses to spaced electrodes 48 projecting through the outer wall of the capsule 22. A pair of pick-up electrodes 49 are similarly mounted along the same wall of the capsule 22 intermediate the electrodes 48. The respective pick-up electrodes, which are insulated from each other and from the electrodes 48, are respectively connected to the input terminals of the amplifier 44, which in turn is connected to deliver its output to the winding 31a of the recording head 31.

With the described modification of the signal generating equipment, it will be understood that during operation of this equipment, and when the capsule 22 is dropped into a bore hole, each voltage pulse resulting from operation of the pulsing element 47 produces an electric field between the electrodes 48. The character and intensity of this field is, of course, influenced by the dielectric properties of the bore hole structure immediately adjacent the outer wall of the capsule 22. Thus, the resistivity of the different formations through which the bore hole extends varies widely as between known geological structures of different types, with a resulting change in the character and intensity of the electric field developed between the electrodes 48. Such changes are manifested by a change in the potential gradient between the pick-up electrodes 49 with the result that a signal voltage is produced at the output side of the amplifier 44, the variable characteristics of which may be analyzed to ascertain the geological structures through which the bore hole extends. This signal voltage, as impressed upon the exciting winding 31a of the recording head 31, may be recorded upon the magnetizable element 11 and then transcribed into permanent record form along with the depth signals, all in the exact manner explained above.

While there has been described what are at present considered to be the preferred embodiments of the invention, it will be understood that various modifications may be made therein which are within the true spirit and scope of the invention as defined in the appended claims.

I claim:

1. Apparatus for recording a physical characteristic of a bore hole, comprising an elongated recording element, means for lowering said element into said hole so that it extends longitudinally of said hole from the top of said hole to a predetermined depth within said borehole, means for developing a signal representative of said characteristic at a predetermined depth in said hole, and means for recording said signal upon said element at a point therealong representative of the hole depth at which said signal is developed.

2. Apparatus for recording a physical characteristic of a bore hole, comprising an elongated recording element, means for lowering said element into said hole so that it extends longitudinally of said hole, a signal generator, means for moving said signal generator longitudinally of said hole and said element, means for controlling said signal generator to develop a variable signal representative of said characteristic as said signal generator is moved longitudinally of said hole, and means for recording said signal upon said element as said generator is moved longitudinally of said hole.

3. Apparatus for recording a physical characteristic of a bore hole, comprising an elongated recording element, means for lowering said element into said hole so that it extends longitudinally of said hole from the top to a predetermined depth within said borehole and for withdrawing said element from said hole, means for developing a signal representative of said characteristic at a predetermined depth in said hole, means for recording said signal upon said element at a point therealong representative of the hole depth at which said signal is developed, means for translating said signal as said element is withdrawn from said hole, and means for recording the translated signal.

4. Apparatus for recording a physical characteristic of a bore hole, comprising an elongated recording element, means for lowering said element into said hole so that it extends longitudinally of said hole and for withdrawing said element from said hole, a signal generator, means for moving said signal generator longitudinally of said hole while said element remains stationary, means for controlling said signal generator to develop a variable signal representative of said characteristic as said signal generator is moved longitudinally of said hole, means for recording said signal upon said element as said generator is moved longitudinally of said hole, means for translating said signal as said element is withdrawn from said hole, and means for recording the translated signal.

5. Apparatus for recording a physical characteristic of a bore hole, comprising an elongated recording element, means for lowering said element into said hole so that it extends longitudinally of said hole from the top to a predetermined depth within said borehole and for withdrawing said element from said hole, means for recording depth marking signals upon said element as said element is lowered into said hole, means for developing a signal representative of said characteristic at a predetermined depth in said hole, means for recording said signal upon said element at a point therealong representative of the hole depth at which said signal is developed, means for translating said signals as said element is withdrawn from said hole, and means for recording the translated signals.

6. Apparatus for recording a variable physical characteristic of a bore hole, comprising an elongated recording element, means for lowering said element into said hole so that it extends longitudinally of said hole and for withdrawing said element from said hole, means for recording depth marking signals upon said element as said element is lowered into said hole, a signal generator, means for moving said signal generator longitudinally of said hole while said element remains stationary, means for controlling said signal generator to develop a variable signal representative of said characteristic as said signal generator is moved longitudinally of said hole, means for recording said signal upon said element as said generator is moved longitudinally of said hole, means for translating said signals as said element is withdrawn from said hole, and means for recording the translated signals.

WILLIAM G. GREEN.

REFERENCES CITED

The following references are of record in the file of this patent:

UNITED STATES PATENTS

| Number | Name | Date |
|---|---|---|
| 2,230,502 | Pearson | Feb. 4, 1941 |
| 2,288,278 | Howell | June 30, 1942 |
| 2,338,991 | Arnold | Jan. 11, 1944 |
| 2,371,628 | Krasnow | Mar. 20, 1945 |